United States Patent [19]
Williams

[11] Patent Number: 5,996,387
[45] Date of Patent: Dec. 7, 1999

[54] METHOD AND APPARATUS FOR PRE-STRETCHING CONTINUOUS CHAIN-LINK DRILLING MUD SEPARATION BELT

[76] Inventor: J. Terrell Williams, P.O. Box 1821, Lake Charles, La. 70602

[21] Appl. No.: 09/146,939

[22] Filed: Sep. 3, 1998

Related U.S. Application Data

[60] Provisional application No. 60/061,380, Oct. 7, 1997.

[51] Int. Cl.$^6$ ...................................................... B21B 5/00
[52] U.S. Cl. ............................................. 72/111; 140/108
[58] Field of Search ............................. 72/111, 302, 378; 140/107, 108

[56] References Cited

U.S. PATENT DOCUMENTS

| | | | |
|---|---|---|---|
| 2,170,308 | 8/1939 | Purves | 72/111 |
| 2,292,412 | 8/1942 | Sutton | 140/107 |

*Primary Examiner*—Lowell A. Larson
*Attorney, Agent, or Firm*—Finnegan, Henderson, Farabow, Garrett & Dunner, L.L.P.

[57] ABSTRACT

A wide endless-loop chain-link drilling mud separation belt formed of a plurality of laterally adjacent jointed links hinged together by transverse rods is pre-stretched prior to its installation and use on a drilling mud separation unit to prevent subsequent elongation, distortion, misalignment, chain tooth jumping, and side loading. The chain-link belt is installed on and driven in a continuous loop around a pair of parallel spaced cylindrical rollers adjustably mounted transversely in a rectangular frame of a hydraulic tensioning machine. The drive roller has a plurality of axially spaced circumferential rows of radially extending teeth that engage the openings in the links and the other roller has a smooth circumference. The drive roller and rear roller are mounted in inner front and rear tensioning frame assemblies, respectively, that are connected by hydraulic cylinders which extend and retract to move the rollers relative to one another and adjustably apply and maintain tension force in the moving chain-link belt as it is driven in a continuous loop over a period of time sufficient to achieve the desired linear expansion. In a preferred embodiment, the cylindrical rollers are formed of a metallic drum having a thick outer elastomeric layer and the teeth of the drive roller are machined into the surface of the elastomeric material to prevent metal-to-metal contact and reduce heat, wear, and friction.

9 Claims, 5 Drawing Sheets

METHOD AND APPARATUS FOR PRE-STRETCHING CONTINUOUS CHAIN-LINK DRILLING MUD SEPARATION BELT

This application claims the benefit under 35 U.S.C. § 119(e) of Provisional Patent Application Ser. No. 60/061,380, filed Oct. 7, 1997.

BACKGROUND OF THE INVENTION

1. Field of the Invention

This invention relates generally to continuous chain-link belts, and more particularly to a method and apparatus for pre-stretching a wide endless-loop chain-link belt formed of a plurality of laterally adjacent jointed links hinged together by transverse rods prior to its installation and use on a drilling mud separation unit to prevent subsequent elongation, distortion, misalignment, chain tooth jumping, and side loading after installation and in use.

2. Brief Description of the Prior Art

Effective solids control systems for controlling the solids in drilling mud has been a goal in the oilfield industry for many years. Various systems have been employed to give higher penetration rates, less contamination of formations, lower mud costs, and less abrasives and sticky materials in the mud system. The systems which are most effective require expensive and complicated machinery and require personnel to monitor and maintain the machinery. Common apparatus used for mechanically removing solids from drilling mud include shale shakers and vibratory screens, desanders, desilters, mud cleaners, and centrifuges. Each piece of equipment is limited to a range of various particle sizes and selectively rejects, undesirable solids and retains desirable solids in the drilling fluid.

The shale shakers and mud cleaners employ a vibrating screen to selectively classify particles by size differences. The desander, desilter, and centrifuge are usually located downstream from the shale shakers and utilize centrifugal force and mass difference between the solids density and liquid density for solids removal.

The initial removal step in most solids control systems is to conduct the drilling mud from the well directly to a shale shaker. Vibrating screen shale shakers of the type used in the oil industry fall into three general categories, as described below.

"Elliptical motion," or "unbalanced design" shakers have a downward slope on the screen to transport cutting across the screen and off the discharge end. Optimum screening with these types of shakers is usually in the range of 30–40 mesh (400–600 microns), and they are prone to bearing failure.

"Circular motion," or "balanced design" shakers produce a balanced, or generally circular motion. The consistent, circular vibration allows solids transport with the basket in a flat, horizontal orientation. This type of shaker usually has multiple decks to split the solids load and allows the use of finer mesh screens in the range of 80–100 mesh (150–180 microns).

"Linear motion," or "straight-line motion" shakers produce a generally straight motion. This motion is developed by a pair of eccentric shafts rotating in opposite directions. Linear motion shakers provide superior cutting conveyance and are able to operate at an uphill slope which allows the use of 200 mesh screens (77 microns).

Most prior art shakers tend to force the cuttings upward from the screen surface and as they continue upward the screen travels down, and as the cuttings fall downward, the screen travels upward and strikes the cuttings which chips small pieces off and creates very fine cuttings that are extremely difficult to remove. Shale shakers are prone to short screen life and their vibratory action tends to drive the cuttings into the screen and leads to screen "blinding" resulting in loss of fluid across the screen. "Blinding" is known as the phenomenon where near-size particles plug the screen or the screen becomes coated with sticky particles Copending U.S. patent application Ser. No. 08/848,807, which is hereby incorporated herein by reference, discloses a new type of continuous belt drilling mud separation system wherein a wide endless-loop chain-link belt is driven in a continuous loop moving along the longitudinal axis of the frame and drilling mud or drilling fluids are conducted onto the moving belt such that liquids and particles smaller than the openings in the belt pass through the openings and liquids and particles larger than the openings are transported on the moving belt and are discharged off of one end as the belt completes its path. The drilling mud separation unit has a drive roller with a plurality of axially spaced circumferential rows of radially extending teeth that are sized and spaced to receive and engage the plurality of laterally adjacent jointed links of the wide belt and are of sufficient length to protrude slightly beyond the outer surface of the links as they pass around the front drive roller to dislodge gumbo and other large solids which may otherwise stick in the openings of the links and clog the belt.

After a period of time in use, a new endless-loop chain-link belt such as that described above will stretch and become elongated and distorted such that the plurality of laterally adjacent jointed links of the wide belt no longer properly align and mesh with the teeth on the drive roller which can cause the chain links to jump off the teeth and side loading of the teeth. As a result, the useful life of the chain-link belt is prematurely shortened, and the belts must be replaced often increasing down-time of the drilling and mud separation operations.

The present invention was developed to provide a method and apparatus for pre-stretching the side endless-loop chain-link belt to produce a long-lasting belt that will not become elongated and distorted after installation and the plurality of laterally adjacent jointed links of the wide belt will maintain proper alignment and mesh with the teeth on the drive roller and thus, does not require frequent replacement nor down-time of the drilling and mud separation operations for chain replacement.

There are several other patents which disclose endless-loop drilling fluid separation units and apparatus for cleaning the bight openings of a link screen conveyor belt, none of which are directed toward a drilling mud separation unit over which a wide endless-loop chain-link belt is driven in a continuous loop, nor suggest an apparatus and method for pre-stretching such a belt prior to installation to prevent its subsequent elongation, distortion, misalignment, chain tooth jumping, and side loading.

Lee, U.S. Pat. No. 4,146,483 discloses a segmented endless belt vibrating screen for removing solid particles from a stream of drilling fluid circulated therethrough. The screen assembly is formed of laterally spaced segments of one or more layers of open mesh screens interconnected by longitudinal rubber support belts disposed therebetween and a pair of rubber strips along the outermost lateral side edges. The rubber strips along the outermost lateral side edges are connected by L-shaped hooks to a pair of rubber V-belts which are received in V-shaped rollers with one set of rollers driven by a motor. The mesh screens are cleaned by a set of nozzles which direct a spray of water onto the screen at a point prior to it passing over a rubber wiper.

Hamacheck III, U.S. Pat. No. 3,631,980 discloses an open mesh belt cleaner for cleaning the bight openings of a link screen conveyer belt in a pea-harvesting machine. The endless belt link screen is supported and driven by a sprocket at each lateral side of the belt which have teeth that engage the links of the belt. The belt cleaner comprises one or more bars which extend transversely between the sprockets and each bar replaces one of the teeth of the opposed sprockets. The bar is provided with a series of debris expelling metal teeth along its length in staggered registry with certain ones of the openings in the belt to penetrate the openings of different rows in successive passes of the belt. Hamacheck III states that it would be undesirable to employ the metal teeth to clean all the successive rows of belt openings in every pass of the belt.

The present invention is distinguished over the prior art in general and these patents in particular by a method and apparatus for pre-stretching a wide endless-loop chain-link drilling mud separation belt formed of a plurality of laterally adjacent jointed links hinged together by transverse rods prior to its installation and use on a drilling mud separation unit to prevent subsequent elongation, distortion, misalignment, chain tooth jumping, and side loading. The chain-link belt is installed on and driven in a continuous loop around a pair of parallel spaced cylindrical rollers adjustably mounted transversely in a rectangular frame of a hydraulic tensioning machine. The drive roller has a plurality of axially spaced circumferential rows of radially extending teeth that engage the openings in the links and the other roller has a smooth circumference. The drive roller and rear roller are mounted in inner front and rear tensioning frame assemblies, respectively, that are connected by hydraulic cylinders which extend and retract to move the rollers relative to one another and adjustably apply and maintain tension force in the moving chain-link belt as it is driven in a continuous loop over a period of time sufficient to achieve the desired linear expansion. In a preferred embodiment, the cylindrical rollers are formed of a metallic drum having a thick outer elastomeric layer and the teeth of the drive roller are machined into the surface of the elastomeric material to prevent metal-to-metal contact and reduce heat, wear, and friction.

SUMMARY OF THE INVENTION

It is therefore an object of the present invention to provide a method and apparatus for pre-stretching a wide endless-loop chain-link drilling mud separation belt formed of a plurality of laterally adjacent jointed links hinged together by transverse rods prior to its installation and use on a drilling mud separation unit.

It is another object of this invention to provide a method and apparatus for pre-stretching a wide endless-loop chain-link drilling mud separation belt formed of a plurality of laterally adjacent jointed links hinged together by transverse rods which will not prematurely stretch and become elongated and distorted after a short period of use.

Another object of this invention is to provide a method and apparatus for pre-stretching a wide endless-loop chain-link drilling mud separation belt formed of a plurality of laterally adjacent jointed links hinged together by transverse rods such that after installation the plurality of laterally adjacent jointed links of the wide belt will maintain proper alignment with the teeth on the drive roller.

Another object of this invention is to provide a method and apparatus for producing a long-lasting pre-stretched wide endless-loop chain-link belt formed of a plurality of laterally adjacent jointed links hinged together by transverse rods for installation and use in a drilling mud separation unit.

A further object of this invention is to provide a method and apparatus for producing a long-lasting pre-stretched wide endless-loop chain-link drilling mud separation belt formed of a plurality of laterally adjacent jointed links hinged together by transverse rods which will not become elongated and distorted after installation.

A still further object of this invention is to provide a method and apparatus for producing a long-lasting pre-stretched wide endless-loop chain-link drilling mud separation belt formed of a plurality of laterally adjacent jointed links hinged together by transverse rods wherein the plurality of laterally adjacent jointed links of the wide belt will maintain proper alignment and mesh with the teeth on the drive roller after extended periods of use and thus, does not require frequent replacement, and significantly reduces down-time of the drilling and mud separating operations for chain replacement.

Other objects of the invention will become apparent from time to time throughout the specification and claims as hereinafter related.

The above noted objects and other objects of the invention are accomplished by a method and apparatus for pre-stretching a wide endless-loop chain-link drilling mud separation belt formed of a plurality of laterally adjacent jointed links hinged together by transverse rods prior to its installation and use on a drilling mud separation unit to prevent subsequent elongation, distortion, misalignment, chain tooth jumping, and side loading. The chain-link belt is installed on and driven in a continuous loop around a pair of parallel spaced cylindrical rollers adjustably mounted transversely in a rectangular frame of a hydraulic tensioning machine. The drive roller has a plurality of axially spaced circumferential rows of radially extending teeth that engage the openings in the links and the other roller has a smooth circumference. The drive roller and rear roller are mounted in inner front and rear tensioning frame assemblies, respectively, that are connected by hydraulic cylinders which extend and retract to move the rollers relative to one another and adjustably apply and maintain tension force in the moving chain-link belt as it is driven in a continuous loop over a period of time sufficient to achieve the desired linear expansion. In a preferred embodiment the cylindrical rollers are formed of a metallic drum having a thick outer elastomeric layer and the teeth of the drive roller are machined into the surface of the elastomeric material to prevent metal-to-metal contact and reduce heat, wear, and friction.

The accompanying drawings, which are incorporated in and constitute a part of this specification, illustrate one embodiment of the present invention and together with the description, serve to explain the principles of the present invention.

DETAILED DESCRIPTION OF THE PRESENT INVENTION

The present method and apparatus is used for pre-stretching a wide endless-loop chain-link drilling mud separation belt formed of a plurality of laterally adjacent jointed links hinged together by transverse rods of the type used in a continuous belt drilling mud separation unit system such as that described in copending U.S. patent application Ser. No. 08/848,807, which is hereby incorporated herein by reference.

Figure 1:
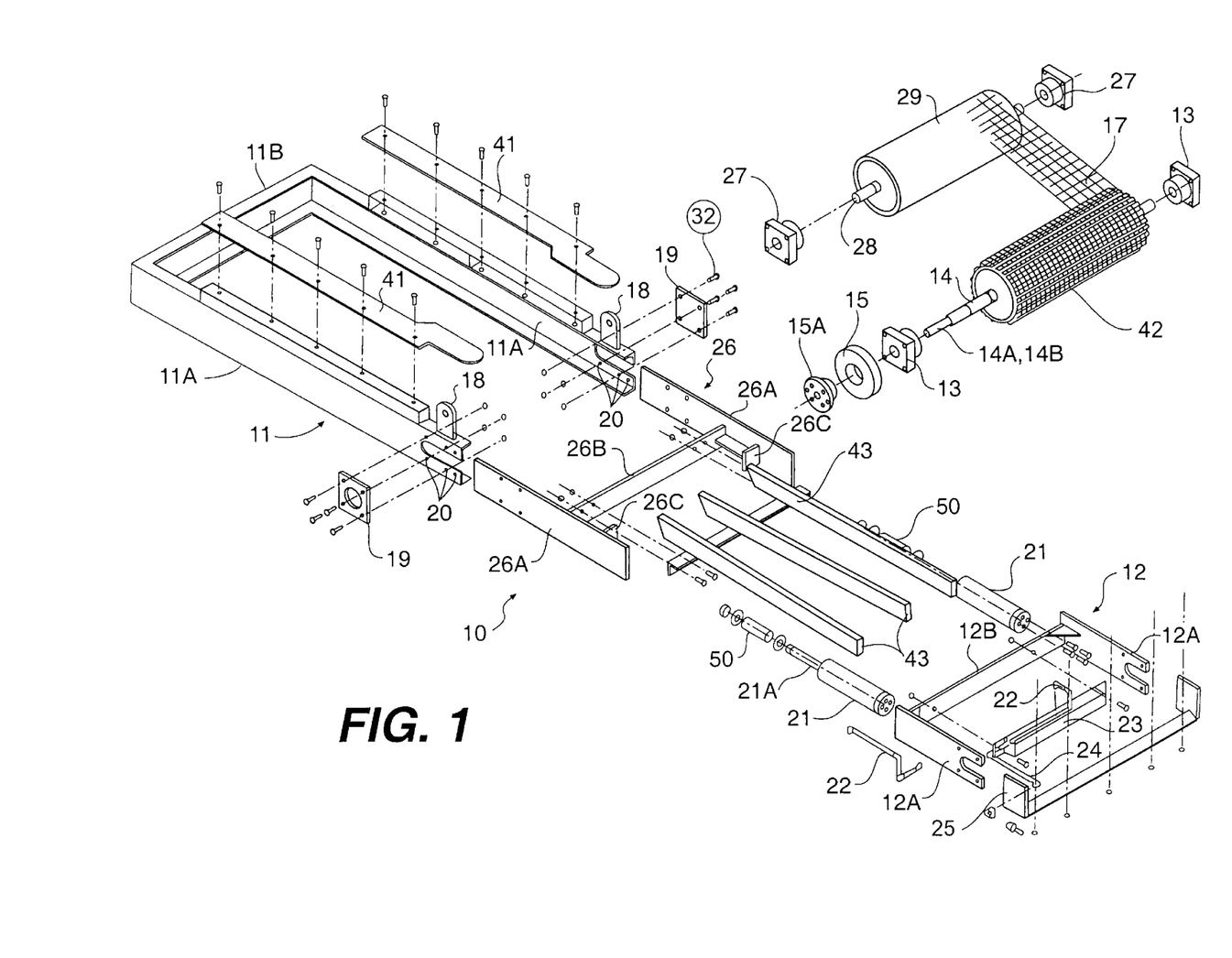
FIG. 1 is an exploded isometric view of the hydraulic pre-tensioning machine for pre-stretching a wide endless-loop chain-link drilling mud separation belt in accordance with the present invention.
Figure 2:
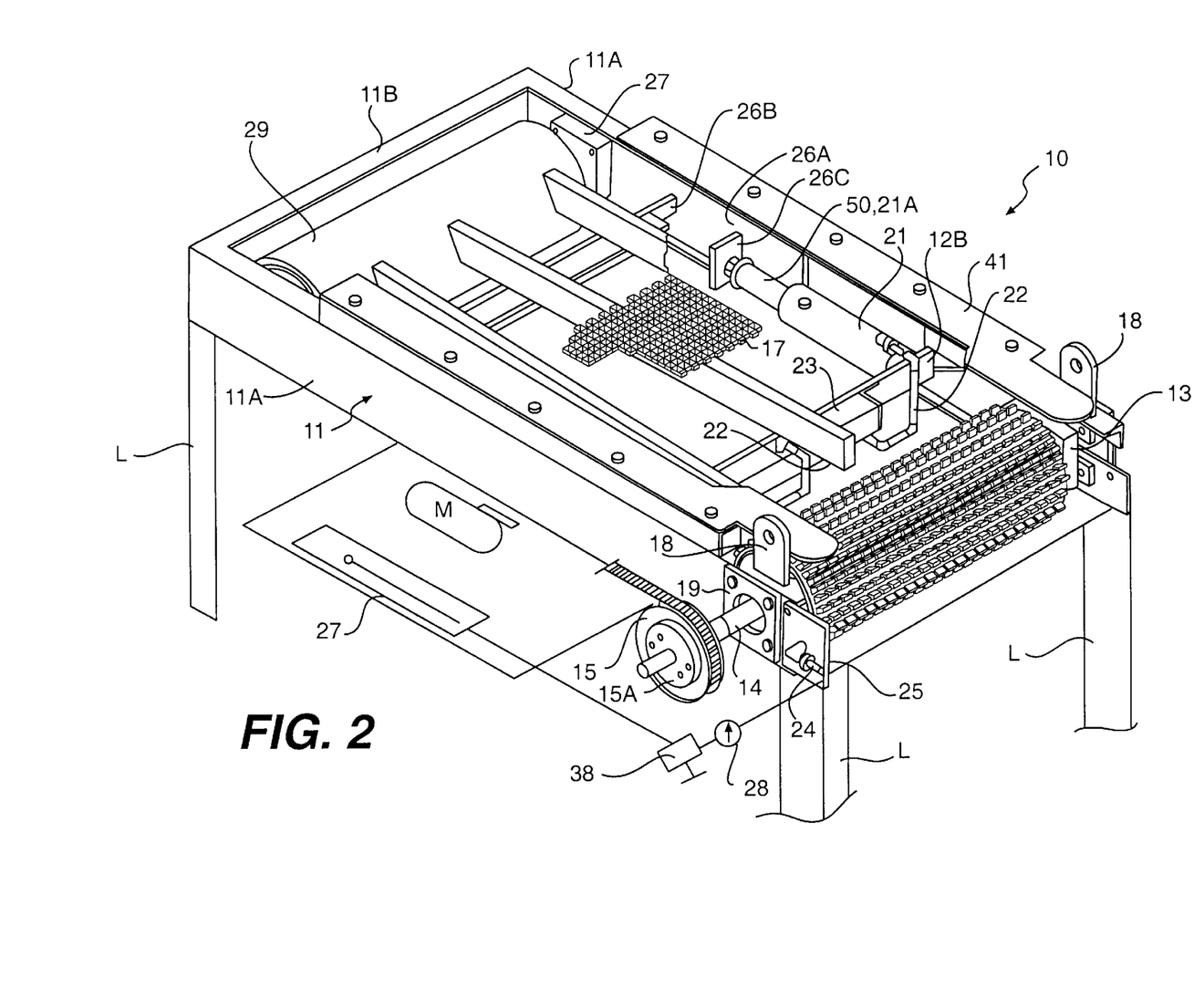
FIG. 2 is an isometric view of the hydraulic pre-tensioning machine in the assembled condition.

Referring now to FIGS. 1 and 2, the hydraulic pre-tensioning machine 10 has a generally rectangular outer frame assembly 11 formed of side and rear C-shaped channel members 11A and 11B, respectively, that supports an inner front tensioning frame assembly 12, an inner rear tensioning frame assembly 26, and other components. the pre-tensioning machine 10 is shown in unassembled condition in FIG. 1 and in assembled condition in FIG. 2. The endless-loop chain-link belt 17 is shown schematically in FIGS. 1 and 2, but is shown in greater detail in FIG. 3.

The inner front tensioning frame assembly 12 is a generally U-shaped configuration formed of a pair of laterally opposed rectangular side plate members 12A with a transverse rectangular crossmember plate 12B secured between the inner facing ends of the side plates. Front bearings 13 are mounted at the outer ends of the opposed plates 12A. The U-shaped inner front tensioning frame assembly 12 carrying the front bearings 13 and drive roller 42 is fixedly connected to the front end of the outer frame assembly 11 by spacer plates 19. The axle 14 of the front drive roller is journalled in the front bearings 13 and its outer ends extend through the front bearings 13 and through the outer frame assembly 11 to receive a drive sheave 15 on either the right or left side of the outer frame 11. Thus, the drive sheave 15 can be located on either the left or the right side of the outer frame 11. A keyway 14A, key 14B, and retainer hub 15A secure the drive sheave 15 onto the axle 14.

Lifting eyes 18 may be secured to the front end of the outer frame assembly 11 to lift and move the pre-tensioning machine 10 as required. The outer frame assembly 11 may also be supported on vertical legs L. The inner front tensioning frame assembly 12, spacer plates 19, and the front bearings 13 are attached to the outer frame assembly 11 to make the front of the pre-tensioning machine 10 rigid. Holes 20 are located on the front of the outer frame assembly 11 to attach the inner front tensioning frame assembly 12, front bearings 13 and spacer plates 19.

The inner rear tensioning frame assembly 26 is a generally H-shaped configuration formed of a pair of laterally opposed rectangular side plate members 26A with a transverse rectangular crossmember plate 26B secured between the side plates and laterally opposed end plates 26C secured near the front ends of the side plates. Rear bearings 27 are mounted at the rear ends of the opposed plates 26A. The axle 28 of the rear roller 29 is journalled in the bearings 27. The H-shaped inner rear tensioning frame assembly 26 carrying the rear bearings 27 and rear roller are not rigidly connected to outer frame assembly 11. Instead, the inner rear tensioning frame assembly 26 is slidably received in the C-shaped side channels of the outer frame 11.

Tensioning cylinders 21 are mounted on the inner front tensioning frame assembly 12 and the outer ends of their piston rods 21A are connected to the end plates 26C at the front ends of the side plates 26B of the inner rear tensioning frame assembly 26. Fluid lines 22 connect the tensioning cylinders 21 to a reservoir 23 which is mounted on the transverse crossmember 12B of the inner front frame assembly 12. The reservoir 23 contains a fluid medium (hydraulic or air) with which to operate the tensioning cylinders 21. A fluid line 24 connected to the reservoir 23 extends through a mounting plate 25 attached to the side of the outer frame assembly 11 and is connected through a pressure regulator and gauge 28 and valve 38 to a fluid supply unit 27 (shown schematically in FIG. 2) that supplies fluid under pressure to the tensioning system.

The outer ends of the piston rods 21A of the tensioning cylinders 21 are connected to the end plates 26C at the front ends of the side plates 26B of the inner rear frame assembly 26. The inner rear frame assembly 26 and rear roller 29 are moved along the C-shaped side channels of the outer frame 11 relative to the outer frame by the tensioning cylinders 21.

Thus, the inner rear tensioning frame assembly 26 carrying the rear roller 29 slides relative to the outer frame 11 and inner front tensioning frame assembly 12 upon extension or retraction of the piston rods 21A of the tensioning cylinders 21. When the piston rods 21A are extended the inner rear frame assembly 26 and rear rollers 29A move rearwardly to apply and maintain tension in the moving chain link belt 17. Tubular collars or spacers 50 may be installed on the piston rods 21A to prevent them from retracting and maintain the tension in the belt 17.

A pair of laterally opposed parallel elongate rectangular guide/support bars 43 are connected at one end to the crossmember 26B of the inner rear tensioning frame assembly 26 and extend forward toward the front of the pre-tensioning machine 10 and over the crossmember 12B of the inner front tensioning frame assembly 12 to support the chain link belt 17. The guide/support bars 43 move with the inner rear tensioning frame assembly 26 relative to the outer frame 11 as tension is applied or relaxed by the tensioning cylinders 21.

A pair of elongate flat guard rails 41 are mounted at the top ends of the C-shaped channels of the outer frame 11 after the moving chain link belt 17 is installed. The guard rails 41 extend inwardly from the sides of the outer frame assembly 11 over the lateral edges of the moving chain link belt 17 and forwardly over the lateral ends of the drive roller 42.

The drive roller 42 and hence the chain link belt 17 is driven by a variable or fixed speed motor M and gearbox (shown schematically in FIG. 2) which is connected to the drive sheave 15 on the outwardly extended end of the drive roller drive shaft 14.

Figure 3:
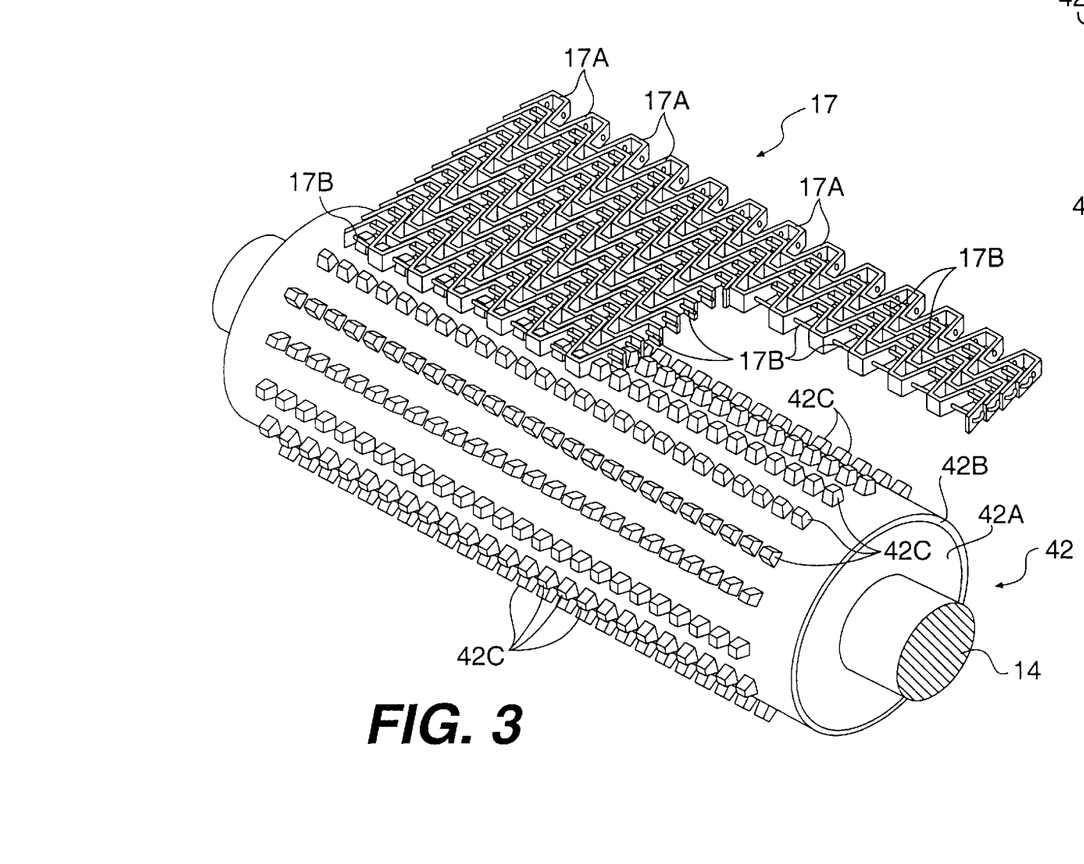
FIG. 3 is an isometric view of a toothed drive roller and chain-link drilling mud separation belt.
Figure 4:
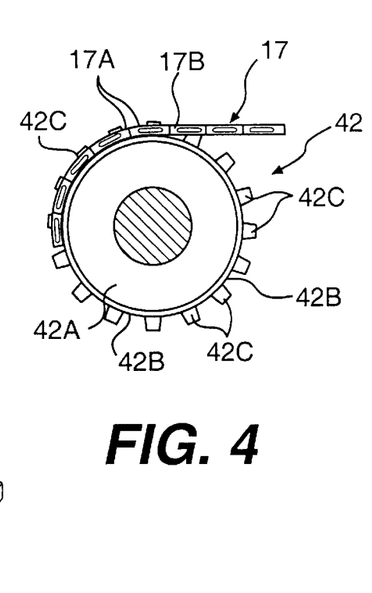
FIG. 4 is a side elevation view of a portion of the chain link drilling mud separation belt and toothed drive roller arrangement.
Figure 5:
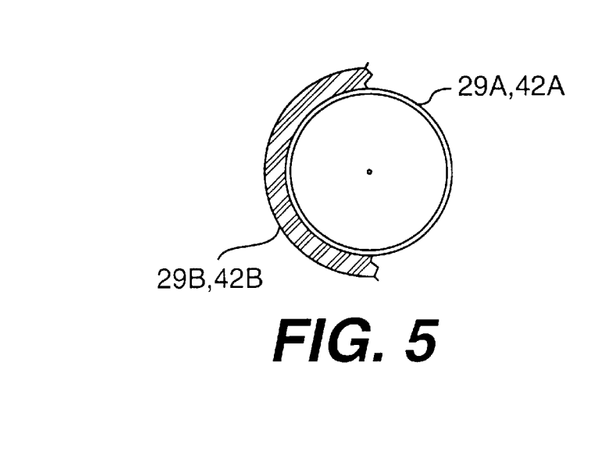
FIG. 5 is a transverse cross section through the composite rollers showing a portion of the elastomeric outer layer.
Figure 6:
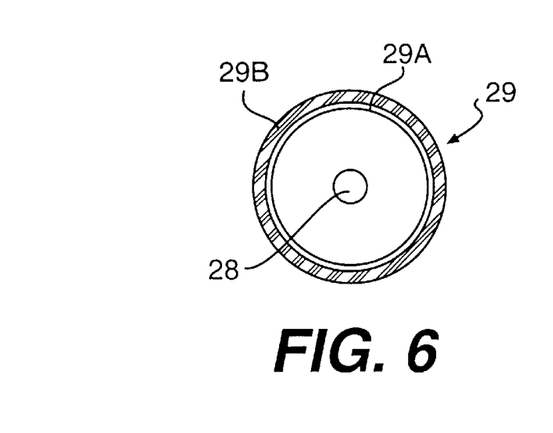
FIG. 6 is a transverse cross section through a rear roller having a smooth elastomeric outer layer.
Figure 7:
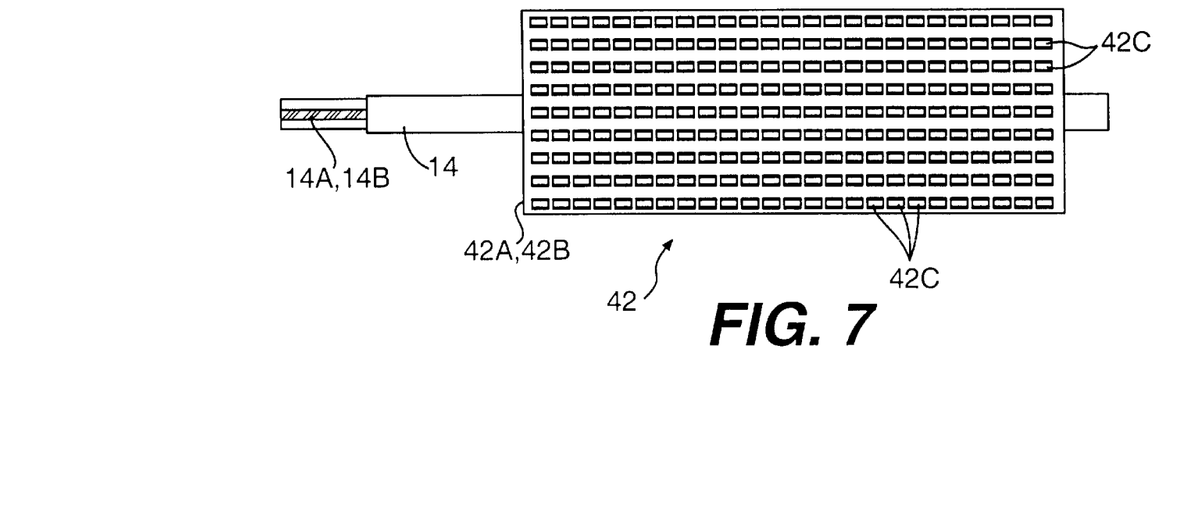
FIG. 7 is an elevation view of the toothed drive roller.
Figure 8:
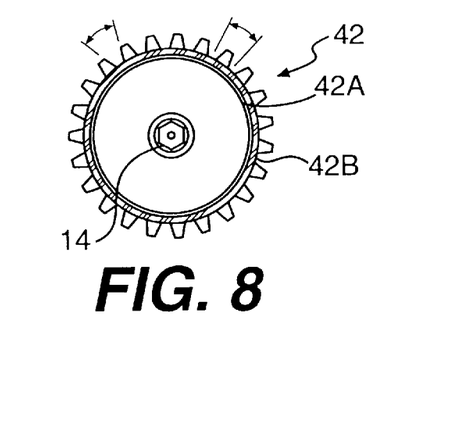
FIG. 8 is a transverse cross section through the toothed roller showing the teeth formed in the elastomeric layer.
Figure 9:
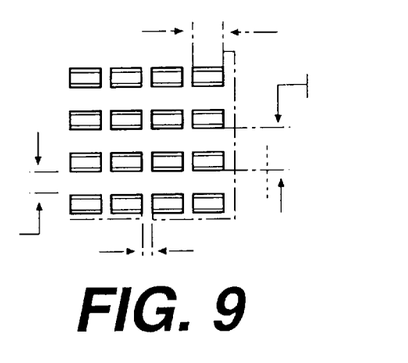
FIGS. 9 and 10 are illustrations of a typical tooth spacing arrangement and typical tooth profile.
Figure 10:
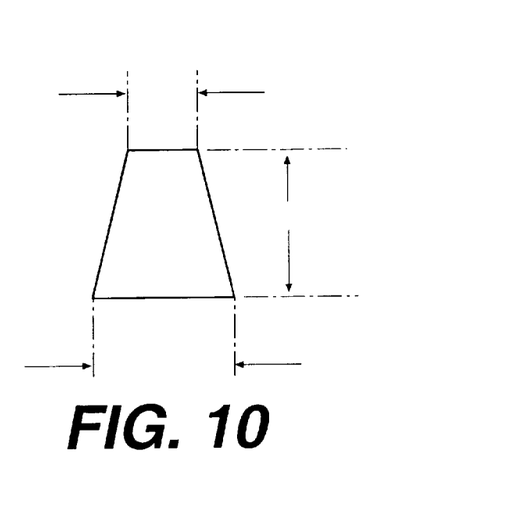

Referring now additionally to FIGS. 3 and 4, the chain-link belt 17 is a wide endless loop belt formed of a plurality of adjacent jointed chain links 17A hingedly connected together by a plurality of parallel spaced transversely extending rods 17B The ends of the wide chain-link belt 17 are connected together to form an endless loop that passes around the front drive roller 42 and rear roller 29. The front drive roller 42 which is used to drive the wide chain link belt 17 has a plurality of axially spaced circumferential spaced rows of radially extending teeth 42C.

The teeth 42C of the drive roller 42 are sized and spaced to be received in the apertures of the jointed chain links 17A of a new chain-link belt. As shown in FIG. 4, the teeth 42C are of sufficient length to protrude slightly beyond the outer surface of the links 17A as they pass around the front drive roller 42. FIGS. 5, 6, 7, and 8 illustrate embodiments of a preferred composite rear roller 29 and front drive roller 42 which are mounted at opposite ends of the frame of the pre-tensioning machine described above and over which the wide endless-loop chain link belt 17 passes. The rear roller 29 (FIGS. 5 and 6) is formed of a cylindrical metal drum 29A, approximately 22" to 24" in length, having an outer diameter of from about 7⅜" to about 7⅞" and an outer layer 29B of elastomeric material of from about 1" to about 1⅛" thick molded or bonded onto its exterior surface. The outer ends of the roller are enclosed by circular end plates having a central collar or aperture through which the axle is secured to extend outwardly from each end. The rear roller 29 (FIG. 6) has a smooth outer layer of elastomeric material.

The toothed drive roller 42 (FIGS. 7 and 8) is also formed of a cylindrical metal drum 42A approximately 22" to 24" in length having an outer diameter of from about 7⅜" to about 7½" and an outer layer 42B of elastomeric material of from about 1" to about 1⅛" thick molded or bonded onto the exterior surface of the drum and its outer ends are enclosed by circular end plates having a central collar through which an axle is secured to extend outwardly from each end and one outer end of its axle is provided with a keyway.

After the elastomeric layer has been molded or bonded onto the drum, the elastomeric material is machined down to form a plurality of axially spaced circumferential rows of radially extending teeth 42C formed out of the elastomeric material by a machining operation. FIGS. 7, 8, 9, and 10 illustrate one example of a typical tooth arrangement and tooth profile. In this example, there are 25 axially spaced circumferential rows of teeth having a width in the axial direction of about 0.74" with a space of about 0.2" between each row. There are 24 circumferentially spaced teeth in each row extending radially outward with their centerlines spaced about 15° apart with a transverse circular pitch of about 1.0275". Each tooth has a transverse thickness of about 0.575" and tapers upwardly to a height of about 0.575" to form an included pressure angle of about 35°27' between the opposed slanted surfaces. The elastomeric roller surfaces and teeth prevent metal-to-metal contact and reduce friction, heat, and wear.

It should be understood that the foregoing tooth description is merely one example of a toothed surface and that many other variations may be made, depending upon the particular application, type of endless belt used, and rotational speed, without departing from the scope of the present invention. For example, the rows of teeth may be arranged in one or more spirals encircling the drum and may have different profiles, i.e., round, square, dovetail, triangle, rectangle, parallelogram, hexagon, octagon, etc. The transverse and longitudinal cross section area of the urethane teeth should be sufficient to withstand torquing, side load, back load, torsional twisting, and temperature. The included angle of the teeth should be sufficient to provide clearance between the apertures of the belt as the roller rotates. The pressure angle of the teeth would also be a determining factor as to such things as the number of teeth, number of rows, the tooth profile, and pitch or lead.

The chain-link belt 17 is rotated around the front drive roller 42 and rear roller 29 in an endless loop at a predetermined speed and the piston rods 21A of the tensioning cylinders 21 are extended to urge the inner rear tensioning frame assembly 26 carrying the rear roller 29 rearwardly relative to the inner front tensioning frame assembly 12 and drive roller 42 to apply and maintain a tension force in the moving chain-link belt 17 over a period of time sufficient to achieve the desired linear expansion.

In a typical pre-stretching operation for a five or six foot chain-link belt, the belt 17 is driven in a continuous loop at a speed of from about 130 ft/min to about 266 ft/min with a constant tension force of about 8,000 lbs applied to the rotating belt by extension of the hydraulic cylinders 21. The process is continued until the chain-link belt runs flat when the load is reduced, or until the desired linear expansion is achieved. The stretched chain-link belt is then removed from the rollers and is now ready for installation on the rollers of the drilling mud separation unit.

The pre-stretched wide endless-loop chain-link belt produced by the present method and apparatus is a long-lasting belt that will not become elongated and distorted after installation and the plurality of laterally adjacent jointed links of the wide belt will maintain proper alignment and mesh with the teeth on the drive roller and thus, does not require frequent replacement, and significantly reduces down-time of the drilling and mud separation operations for chain replacement.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. Apparatus for pre-stretching an endless-loop chain-link drill mud separation belt formed of a plurality of laterally adjacent jointed links hinged together by transverse rods prior to installation and use of the belt on a drilling mud separation unit, said apparatus comprising:

a pair of rollers, with one of said rollers being a drive roller having a plurality of axially spaced circumferential rows of radially extending teeth in engagement with openings in said links of said belt, said drive roller being mounted in and journalled for rotation in a front frame and said other of said pair of rollers being mounted in and journalled for rotation in a rear frame, said front and rear frames being connected to means for producing relative movement of said rollers to apply and maintain a tensioning force to said belt installed on and driven in a continuous loop around said pair of rollers.

2. The apparatus of claim 1, wherein said other of said pair of rollers has a smooth circumference.

3. The apparatus of claim 1, wherein said means for producing relative movement of said rollers includes a pair of hydraulic cylinders mounted between said frames with one of said pair of cylinders on each side thereof.

4. The apparatus of claim 1, wherein said front and rear frames are supported on a rectangular outer frame.

5. The apparatus of claim 4, wherein said front frame is generally U-shaped and formed of a pair of laterally opposed rectangular side plates, with a transverse rectangular cross-member secured between inner facing ends of said pair of side plates.

6. The apparatus of claim 5, wherein said drive roller is mounted for rotation on an axle having ends extending through bearings and said outer frame for connection to means for driving said drive roller.

7. The apparatus of claim 6, wherein said rear frame is generally H-shaped and formed of a pair of laterally opposed rectangular side plates with a transverse crossmember secured between said side plates and laterally opposed end plates secured at front ends of said side plates.

8. The apparatus of claim 1, wherein said rear frame is slidably mounted in said outer frame.

9. The apparatus of claim 8, wherein said rear frame is slidably mounted in C-shaped side channels of said outer frame.

* * * * *